United States Patent [19]

Stankus

[11] Patent Number: 5,009,549
[45] Date of Patent: * Apr. 23, 1991

[54] EXPANSION ASSEMBLY FOR MINE ROOF BOLTS

[75] Inventor: John C. Stankus, Canonsburg, Pa.
[73] Assignee: Jennmar Corporation, Pittsburgh, Pa.
[ * ] Notice: The portion of the term of this patent subsequent to Aug. 29, 2006 has been disclaimed.
[21] Appl. No.: 363,274
[22] Filed: May 22, 1989

Related U.S. Application Data

[63] Continuation of Ser. No. 275,205, Nov. 22, 1988, Pat. No. 4,861,198.

[51] Int. Cl.⁵ .............................................. E21D 20/02
[52] U.S. Cl. .................................. 405/261; 405/259; 411/67
[58] Field of Search .................. 405/259, 260, 261; 411/15, 24, 25, 78, 63, 64, 61, 44, 18, 67

[56] References Cited

U.S. PATENT DOCUMENTS

| | | | |
|---|---|---|---|
| 2,570,003 | 10/1951 | Palmer | 411/65 |
| 2,753,750 | 7/1956 | Dempsey | 411/67 |
| 3,248,998 | 5/1966 | Siegel | 411/67 |
| 3,620,120 | 11/1971 | Warner | 411/67 X |
| 3,726,181 | 4/1973 | Dickon et al. | 411/67 X |

Primary Examiner—Dennis L. Taylor
Attorney, Agent, or Firm—Stanley J. Price, Jr.

[57] ABSTRACT

An improved expansion assembly for a mine roof bolt has a tapered plug, two expansion leaves that bear against the tapered plug, a bail that connects the expansion leaves and extends over the end of the mine roof bolt, and a breakable holding ring to keep the expansion assembly assmebled until after it is placed into the bore hole. The tapered plug has a threaded bore therethrough for threading onto the mine roof bolt. The tapered plug also has tapered surfaces that have an angle of taper of 8° to the axis of the mine roof bolt. The expansion leaves each have nine serrations formed on the surface such that the serrations are formed by the intersection of a planar surface perpendicular to the axis of the mine roof bolt and a frusto-conical surface. The frusto-conical surface is at an angle of 69° to the planar surface. The serrations are equally spaced from each other and have a peak to peak distance of 0.25". The expansion leaves each have a maximum length of 3". The tapered plug has a relieved upper edge and channels running longitudinally along the outer surfaces of the legs of the plug and the expansion leaves have channels formed near the end of the leaves, all for facilitating use of the expansion assembly with resin. The improved expansion assembly may be utilized with or without resin bonding.

10 Claims, 2 Drawing Sheets

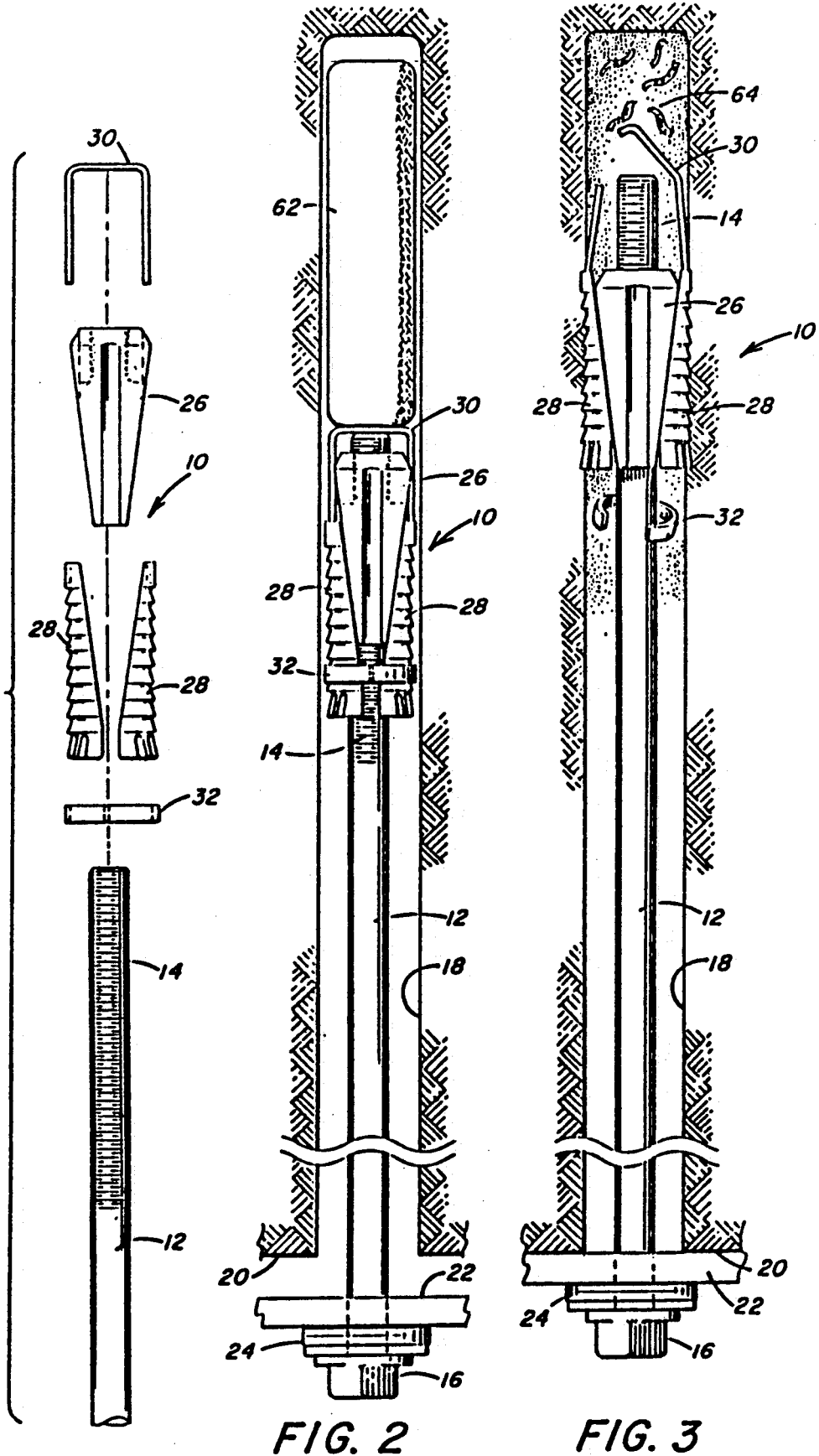

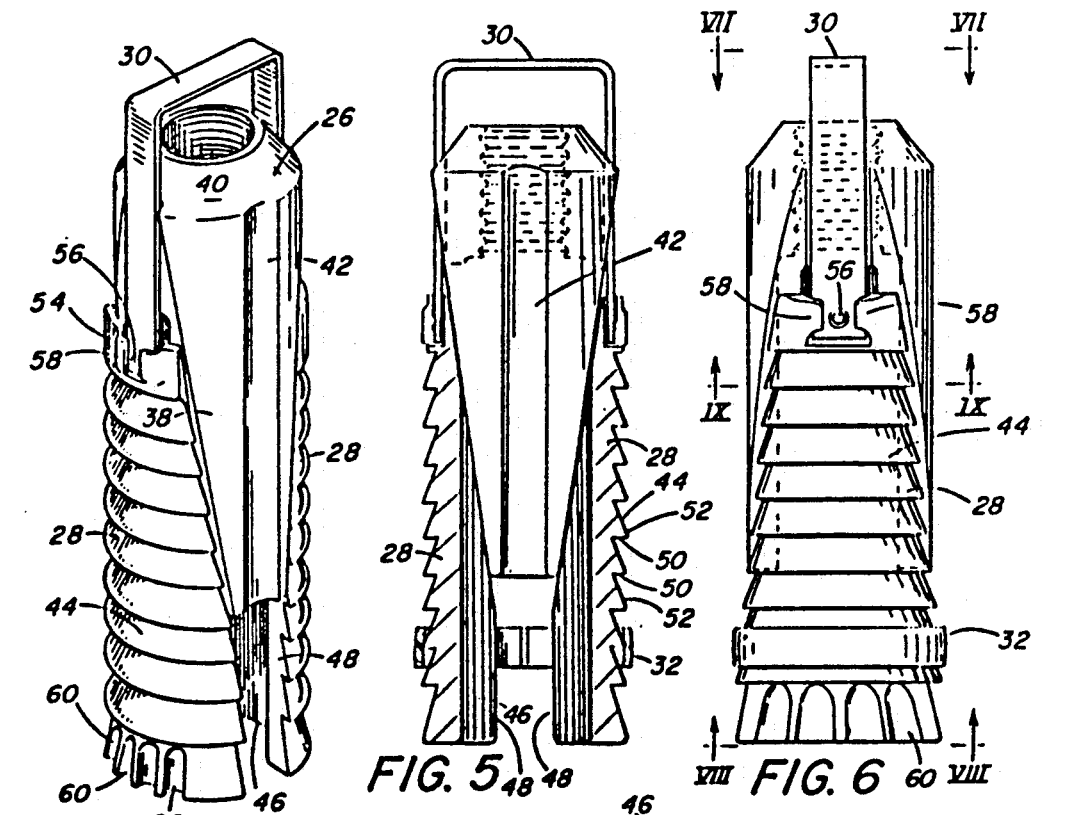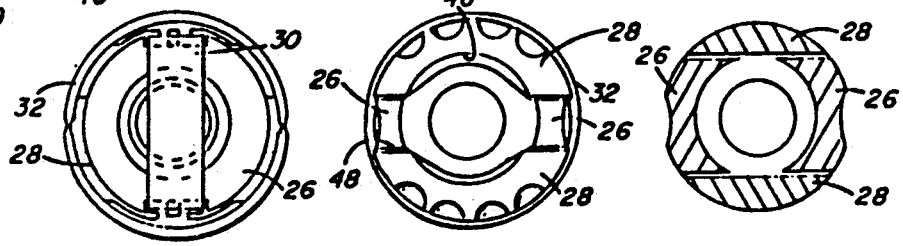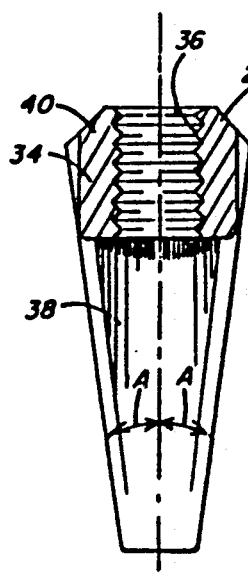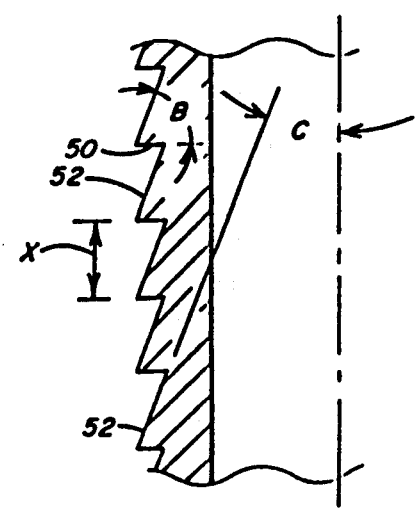

EXPANSION ASSEMBLY FOR MINE ROOF BOLTS

CROSS REFERENCE TO RELATED APPLICATIONS

The application is a continuation of copending application Ser. No. 275,205, filed on Nov. 22, 1988, entitled, "Expansion Assembly for Mine Roofs Bolts" now U.S. Pat. No. 4,861,198 by John C. Stankus.

BACKGROUND OF THE INVENTION

1. Field of the Invention

This invention relates to an improved expansion assembly for mine roof bolts which provides greater gripping forces on the inside of the bore hole in the mine roof than can be obtained by similar prior expansion assemblies. The expansion assembly of the present invention may be utilized with or without resin bonding materials.

2. Description of the Prior Art

It is well known in the art of mine roof support to tension bolts anchored in bore holes drilled in the mine roof to reinforce the unsupported rock formation above the roof. Conventionally a hole is drilled through the roof into the rock formation. The end of the bolt in the rock formation is anchored either by engagement of an expansion shell on the end of the bolt with the rock formation, or by bonding the bolt with resin to the rock formation surrounding the bore hole, or by use of both an expansion assembly and resin together to retain the bolt within the hole. Examples of an arrangement utilizing both an expansion assembly and resin to anchor a mine roof bolt are disclosed in U.S. Pat. Nos. 4,419,805, 4,413,930, 4,516,885 and 4,518,292. Other examples of utilizing both an expansion assembly and resin to anchor a mine roof bolt are shown in U.S. Pat. Nos. 3,188,815, 4,162,133, 4,655,645 and 4,664,561.

Expansion assemblies for roof bolts have been utilized for many years without resin being utilized in the same installation. There have been countless efforts to improve the configuration of various components of the expansion assemblies to provide better anchoring within the bore hole. U.S. Pat. Nos. 2,667,099 and 2,783,673 each show examples of expansion assemblies. U.S. Pat. No. 2,570,003 discloses an expansion assembly which has a ring like band around the expansion leaves to hold the assembly together while it is being inserted in the bore hole. U.S. Pat. No. 4,764,055 discloses an expansion assembly which has been modified in many respects to accommodate the use of resin bonding with the expansion assembly.

The use of a mechanical expansion assembly and resin bonding together in the same bore hole produces a roof bolt whose anchorage depends upon both the characteristics of the expansion shell and the characteristics of the resin. The use of the resin tends to mask the characteristics of the expansion assembly and many inferior expansion assemblies have been utilized with resin since the resin bonding enhances the mechanical expansion assembly to the extent that inferiorities in the expansion assembly are not readily discernable.

There are on the market many types of expansion assemblies that are manufactured with a tapered plug and expansion leaves so that as the tapered plug is threaded onto the mine roof bolt, it urges the expansion leaves radially outwardly to grip the interior of the bore hole in which the mine roof bolt is inserted. These earlier expansion assemblies are of two general types. One type has a ring to which are affixed several upwardly extending expansion leaves. The ring surrounds the bolt and the tapered plug moves downwardly toward the ring as the assembly is expanded. Another general type of expansion shell is a bail-type shell in which two expansion leaves are supported by a bail that extends over the end of the mine roof bolt and prevents the expansion leaves from moving axially relative to the bolt. U.S. Pat. Nos. 2,667,099 and 2,783,673 both disclose bail-type expansion assemblies. The present invention is directed to an improved bail-type expansion assembly.

I have taken a commercially available bail-type expansion assembly and modified its components so that greatly improved gripping power is generated by the expansion assembly when it is utilized in the bore in a mine roof bolt. At the same time, this improved expansion assembly has also been modified so that it may optionally be utilized with resin bonding. It need not, however, be utilized with resin bonding and provides greatly enhanced holding power even if no resin bonding is utilized in conjunction with it.

SUMMARY OF THE INVENTION

I have found that by changing the sizes and the angles of various components of a bail-type mine roof bolt expansion assembly that the expansion assembly has greatly enhanced gripping power as is evidenced by pull tests that have been conducted on mine roof bolts utilizing the improved expansion assembly. A series of size and angle changes to the commercially available bail-type expansion assembly have been made to provide a surprising improvement in performance of the improved expansion assembly of the present invention.

In accordance with the present invention, there is provided an expansion assembly for a mine roof bolt having a threaded portion at one end and a bolt head at the other end. The expansion assembly includes a tapered plug having a body portion with a threaded internal bore adapted to be threaded onto the bolt threaded end portion and two legs depending from the body portion that straddle the bolt and extend toward the bolt head when the plug is threaded onto the bolt threaded portion. The body portion and depending legs of the tapered plug together form continuous tapered surfaces that each form an angle of at least 8° to the axis of the bolt when the plug is threaded onto the bolt. A pair of expansion leaves each having a serrated outer surface, a smooth inner surface and tapering edge surfaces joining the inner and outer surfaces surround the bolt at a radially spaced distance from the bolt when the expansion assembly is positioned on the bolt. Each of the leaf tapering edge surfaces is in abutting contact with the tapered plug tapered surfaces whereby the leaves are forced apart when the tapered plug is threaded axially onto the roof bolt and the leaves are restrained from axial movement relative to the roof bolt.

Each leaf serrated outer surface is formed with nine serration edges extending circumferentially around the leaf outer surface in parallel planes perpendicular to the axis of the bolt and equally spaced a distance of no more than 0.27 inches and no less than 0.22 inches apart. The edges of the serrations are formed by intersecting surfaces with the surface closer to the bolt head being a plane perpendicular to the bolt axis and with the surface closer to the bolt threaded end portion being a frustoconical surface whose conical elements are at an angle of 69° from the plane surface of the serration. A metal bail is connected to each of the expansion leaves and extends over the end of the roof bolt to prevent axial movement of the leaves relative to the roof bolt when the tapered plug is threaded onto the bolt to force the leaves apart. A breakable holding ring is positioned around the expansion leaves to hold the expansion assembly in an assembled position on the roof bolt until expansion of the assembly by forcing the leaves apart causes the holding ring to break.

Further in accordance with the present invention, the tapered plug body portion has its surface that is positioned closer to the bolt threaded end formed with a relieved edge to facilitate penetration of resin by the expansion assembly. In addition, the depending legs on the tapered plug have longitudinal channels formed in them to facilitate the flow of resin down, past and around the expansion assembly. The expansion leaves have a series of vertical channels formed adjacent the end of the leaves closer to the bolt head to facilitate the flow of resin down, past and around the expansion assembly.

I have found that by increasing the total angle of the plug taper by 4°, and by reducing the number of serrations on the outer surface of the expansion leaves, as well as reducing by 1° the angle between the conical surface and the planar surface forming the serrations and making the edges of the serrations approximately ¼" apart, I have been able to greatly enhance the holding power of the commercially available bail-type expansion assembly.

In addition, I have been able to adapt the improved expansion assembly to be utilized with resin bonding more efficiently by relieving the edge of the top of the tapered plug to permit the tapered plug to more easily penetrate into the resin, by forming channels in the legs of the tapered plug to permit the resin to run down alongside the tapered plug within the bore hole, and by providing channels near the ends of the expansion leaves to permit resin to channels downwardly from above the expansion assembly to below it. I have also found that when the parts of the expansion assembly are pearlitized as by heat treatment, the pearlitization enhances the strength of the iron of which the parts are cast and thereby enhances the gripping ability of the expansion assembly.

Accordingly, the principal object of the present invention is to provide an improved expansion assembly for a mine roof bolt which will produce greatly enhanced gripping power when the expansion assembly is utilized to secure a mine roof bolt in the bore hole of a mine roof.

Another object of the present invention is to provide an improved expansion assembly which may be utilized with or without resin bonding to enhance the capabilities of the expansion assembly.

A further object of the present invention is to provide an improved mine roof bolt expansion assembly which, when utilized with resin bonding, has features that make the resin more effectively flow down, past and around the expansion assembly on the bolt.

These and other objects of the present invention will be more completely disclosed and described in the following specification, the accompanying drawings and the appended claims.

BRIEF DESCRIPTION OF THE DRAWINGS

FIG. 1 is an exploded view of the improved expansion assembly of the present invention and the threaded end of a mine roof bolt.

FIG. 2 is a side elevation of a mine roof bolt having an expansion assembly of the present invention installed thereon and positioned in the bore of the mine roof with an intact resin capsule above the expansion assembly.

FIG. 3 is the mine roof bolt of FIG. 2 shown after the resin capsule has been penetrated and the expansion assembly has been expanded within the bore hole.

FIG. 4 is a perspective view of the expansion assembly of the present invention without the bolt and without the holding ring installed thereon.

FIG. 5 is an elevational view of the improved expansion assembly partially in section.

FIG. 6 is an elevational view similar to FIG. 5 with the expansion assembly rotated 90° in FIG. 6 from the position shown in FIG. 5.

FIG. 7 is a top plan view of the expansion assembly taken along line VII—VII of FIG. 6.

FIG. 8 is a bottom view of the expansion assembly of the present invention taken along line VIII—VIII of FIG. 6.

FIG. 9 is a sectional view taken along line IX—IX of FIG. 6.

FIG. 10 is an elevational view partially in section of the tapered plug of the expansion assembly of the present invention.

FIG. 11 is an elevational view of the tapered plug of the present invention rotated 90° from the position shown in FIG. 11.

FIG. 12 is an expanded detail of the circled portion of FIG. 5.

DESCRIPTION OF THE PREFERRED EMBODIMENT

Referring to the drawings, and particularly to FIGS. 1-3, there is shown an expansion assembly indicated generally at 10 to be utilized on a mine roof bolt 12 that has a threaded portion 14 at one end and a bolt head 16 at the other end. The roof bolt 12 is designed to be inserted into a bore hole 18 formed in a mine roof 20 so that the expansion assembly 10 at one end of the bolt 12 may secure the bolt 12 within the bore hole 18 and tension may be exerted on the bolt between the expansion assembly 10 and the mine roof 20. In conventional fashion, a roof plate 22 and washers 24 are placed between the mine roof 20 and the bolt head 16. The expansion assembly 10 has a tapered plug 26, expansion leaves 28, a bail 30 and a holding ring 32. As best seen in FIGS. 10 and 11, the tapered plug 26 has a body portion 34 with a threaded bore 36 formed therein. Two legs 38 depend from the body portion 34. The body portion 34 has a relieved or chamferred edge 40 that has a frusto-conical configuration to the plug 26 upwardly into the resin facilitate movement of bonding material as will be described. As best seen in FIGS. 4 and 5, the depending legs 38 of tapered plug 26 each have channel 42 that extends vertically down the outside of the leg.

Referring again to FIG. 10, it will be seen that the angle A that the edge of the tapered plug forms with the longitudinal center line of the bore 36 is equal on each side of the center line. In the prior art, angle A was 6°. In the expansion assembly of the present invention, angle A has been increased to 8°. It will be seen that the overall angle from one side of the plug to the other is now 16° as opposed to the 12° as appeared in the prior art. With the increased angle A, the tapered plug 26 will now force the expansion leaves 28 apart more quickly as the plug 26 is threaded down the bolt 12.

As best seen in FIGS. 4, 5 and 6, the expansion leaves 28 are identical to each other and two of the leaves 28 are utilized on each expansion assembly 10. The leaves 28 have a serrated surface 44, a smooth cylindrical inner surface 46 and tapering edge surfaces 48 which connect the serrated surface 44 and the cylindrical inner surface 46 all along the periphery of the expansion leaves 28. Near the bottom of the expansion leaves 28, the outer surface of each leaf forms complete semi-circle to surround the bolt 12 when the expansion assembly 10 is placed upon the bolt as may be seen in FIG. 8. The leaves 28 gradually taper upwardly so that, as shown in FIG. 9, the serrated surface 44 of each leaf 28 forms only approximately one-quarter of a circle.

As best seen in FIGS. 2 and 5, the tapering edge surfaces 48 abut the legs 38 of tapered plug 26. It should be noted that near the bottom of the expansion leaves 28 as viewed in FIGS. 2 and 5, the tapering edge surfaces 48 are parallel to each other on the adjacent expansion leaves. As the tapering surfaces 48 extend upwardly from the bottom of the expansion leaves 28 as viewed in FIGS. 2 and 5, they begin to taper in conformity with the legs 38 of tapered plug 26.

Each expansion leaf 28 has nine horizontal serrations formed by the intersection of planar surfaces 50 and frustoconical surfaces 52 (see FIGS. 5 and 12) so that there are nine individual ridges extending horizontally around each expansion leaf 28. As seen in FIG. 12, the conical elements of the frusto-conical surface 52 form an angle B with the planar surface 50. Angle B is preferably 69° for maximum effectiveness of the serrations. In prior art devices similar to expansion assembly 10, the angle B was 70° but I have found that reducing that angle by 1° produces surprisingly effective results for the expansion assembly 10. Also shown on FIG. 12 is angle C which is formed by the extension of conical elements from the frusto-conical surface 52 to the intersection of the axis through the expansion assembly 10. With angle B being 69°, angle C is 21°.

I have also found that the gripping ability of the expansion assembly 10 within the bore hole 19 is also greatest if the distance from peak to peak of the serration on expansion leaves 28, as indicated by dimension X in FIG. 12, is approximately 0.25". Dimension X should not be more than 0.27" and should not be less than b 0.22" to give maximum effectiveness to the gripping ability of the leaves 28. For practicality of manufacture, the expansion leaves 28 should not be longer than 3" from top to bottom as viewed in FIGS. 4, 5, and 6. The expansion leaves 28 will have nine serrations with the peaks of the serrations equally spaced from each other and each being approximately 0.25" from the other.

The expansion leaves 28 are connected to teach other by bail 30 with a bail connection 54 formed on each of the expansion leaves 28. The bail connection 54 on each expansion leaf 28 is formed with a pin 56 formed integrally with the leaf 28 and a pair of ears 58 formed on each leaf 28. In conventional fashion, the bail 30 is placed over pin 56 so that pin 56 extends through a hole in the bail and the ears 58 are peened over the bail 30. Bail 30 is formed of relatively resilient metal. The expansion leaves 28 and the tapered plug 26 are preferably pearlitized by heat treatment to enhance their strength and thereby enhance the gripping ability of the expansion assembly 10. At the bottom of the serrated surface 44 of expansion leaf 28 four channels 60 are formed. The channel facilitate the flow of resin downwardly along the expansion assembly 10.

As seen in FIGS. 2 and 3, the expansion assembly 10 is positioned on roof bolt 12 which is, in turn, placed within bore hole 18 formed in mine roof 20. A resin cartridge 62 containing resin and catalyst components which, when mixed, form a resin bonding material, is placed in the bore hole 18 above the expansion assembly 10. The holding ring 32 which is preferably formed of a breakable, flexible plastic, is positioned around the expansion leaves 28 to hold the expansion assembly 10 together while the bolt 12 is being inserted into the bore 18. After the bolt 12 is inserted into bore 18, it is forced upwardly so that the bolt 12 and the bail 30 rupture the resin cartridge 62. The resin is mixed by rotation of the bolt 12 and expansion assembly 10 and the expansion assembly 10 then begins to expand by reason of tapered plug 26 being threaded downwardly as viewed in FIGS. 2 and 3 to expand the leaves 28 forcefully against the wall of bore 18. The free resin 64 shown in FIG. 3 flows downwardly around and past the expansion assembly 10. The channels 42 in tapered plug 26 and the channels 60 in expansion leaves 28 facilitate the flow of resin downwardly past the expansion assembly 10. At the same time, the relieved frusto-conically shaped edge 40 of tapered plug 26 facilitates initial movement of the expansion assembly 10 upwardly through the resin to reduce the back pressure that would ordinarily be created by the resin acting against tapered plug 26.

As the expansion leaves 28 are forced apart by tapered plug 26, holding ring 32 ruptures and permits the expansion assembly 10 to expand. The bail 30 also ruptures as seen in FIG. 3. The holding ring 32 is so sized that it ruptures when the leaves begin to expand and the ring 32 need not be removed from the expansion assembly 10 prior to insertion of the assembly 10 into the bore hole 18. In many prior art devices, a large holding ring has been utilized to transport bail-type expansion assemblies to the mine and those rings had to be removed from the expansion assembly before it was placed in the bore hole. Holding ring 32 also has the effect of delaying expansion of assembly 10 to cause mixing of the resin by rotation of the bolt 12 and expansion assembly 10 as a unit.

It should be appreciated that the improved expansion assembly 10 of the present invention can be utilized either with resin or without resin to secure a mine roof bolt 12 within a bore hole. The invention has been illustrated with drawings showing a resin capsule 62 to provide resin anchorage of the expansion assembly 10. The relieved edge 40 on tapered plug 26, the channels 42 on the legs of tapered plug 26 and the channels 60 on the expansion leaves 28 all facilitate the use of resin with the expansion anchor 10 of the present invention. Nevertheless, the angle A of the tapered plug 26, the angle B of the serrations on expansion leaves 28, the spacing of the serrations at dimension X and the provision of nine serrations on an expansion leaf that is three inches long all provide greatly enhanced gripping power for the expansion assembly 10 of the present invention. Thus, even when utilized without resin bonding, the expansion assembly 10 provides surprisingly good anchorage within the bore hole In one test of the expansion assembly 10 without resin bonding, the expansion assembly was inserted into the bore of a roof of a coal mine. The expansion assembly was threaded onto a nominal ¾" diameter rebar that was 5' long. The bore hole had a diameter of 1⅜". The expansion assembly, as described, had a tapered plug having an angle A of 8°, expansion leaves having nine serrations with the serrations being equally spaced from each other a distance of 0.25" and with angle B being 69°. After the expansion shell was expanded by rotating the bolt, a force was exerted on the end of the bolt to attempt to pull the bolt from the hole. The force was increased in increments of 2,000 pounds of pull and the anchorage continued to hold at a pulling force of 31,500 pounds.

In another test in the same mine at the same time, another expansion shell and rebar of identical construction was utilized. The expansion assembly was set in place and pulled with a force of 28,000 pounds. When additional pulling force was added, the rebar itself broke with somewhere between 28,000 and 30,000 pounds of pulling force being exerted on the bolt. The anchorage of the expansion assembly 10 remained intact.

In still another test of the expansion assembly 10 of the present invention that took place in another coal mine, the expansion assembly of the present invention was threaded onto a nominal 3¾" diameter reinforcing bar. The bore hole was 1⅜ in diameter. The assembly was installed without resin and one hour and 49 minutes later, the bolt was pulled A force of 30,000 pounds was applied to pull the rebar and the expansion shell held in place without movement. A deflection of 1.17" was noted which was attributed to the elongation of the rebar under heavy load.

According to the provisions of the Patent Statutes, I have explained the principle, preferred construction and mode of operation of my invention and have illustrated and described what I now consider to be its best embodiment. However, it should be understood that, within the scope of the appended claims, the invention may be practiced otherwise than as specifically illustrated and described.

I claim:

1. An expansion assembly for a mine roof bolt having a threaded portion at one end and a bolt head at the other end comprising;
   a tapered plug having a body portion with a threaded internal bore adapted to be threaded onto said bolt threaded end portion, said tapered plug having two legs depending from said body portion that straddle said bolt and extend toward said bolt head when said plug is threaded onto said bolt threaded portion, said body portion and said depending legs forming continuous tapered surfaces that each form an angle of at least 8° to the axis of said bolt when said plug is threaded onto said bolt;
   said tapered plug body portion having the surface positioned closer to said bolt threaded end formed with a relieved edge having a frusto-conical configuration to facilitate penetration of resin by said expansion assembly,
   a pair of expansion leaves each having a serrated outer surface, a smooth inner surface and tapering edge surfaces joining said inner and outer surfaces, said expansion leaves each surrounding said bolt at a radially spaced distance from said bolt when said expansion assembly is positioned on said roof bolt, each of said leaf tapering edge surfaces being in abutting contact with said tapered plug tapered surfaces whereby said leaves are forced apart when said tapered plug is threaded axially onto said roof bolt and said leaves are restrained from axial movement relative to said roof bolt,
   a metal bail connected to each of said expansion leaves and extending over the end of said roof bolt to prevent axial movement of said leaves relative to said bolt when said tapered plug is threaded onto said bolt threaded portion to force said leaves apart.

2. The expansion assembly of claim 1 wherein said tapered plug depending legs have longitudinal channels formed therein to facilitate the flow of resin down, past and around said expansion assembly.

3. The expansion assembly of claim 1 wherein said expansion leaves have a series of vertical channels formed on the end of said leaves closer to said bolt head to facilitate the flow of resin down, past and around said expansion assembly.

4. The expansion assembly of claim 1 wherein said tapered plug body portion has the surface positioned closer to said bolt threaded end formed with a relieved edge, said tapered plug depending legs having longitudinal channels formed therein and said expansion leaves have a series of vertical channels formed on the end of said leaves closer to said bolt head so that penetration of resin by said expansion assembly is facilitated and the flow of resin down, past and around said expansion assembly is facilitated.

5. An expansion assembly for a mine roof bolt having a threaded portion at one end and a bolt head at the other end comprising;
   a tapered plug having a body portion with a threaded internal bore adapted to be threaded onto said bolt threaded end portion, said tapered plug having two legs depending from said body portion that straddle said bolt and extend toward said bolt head when said plug is threaded onto said bolt threaded portion, said body portion and said depending legs forming continuous tapered surfaces,
   a pair of expansion leaves each having a serrated outer surface, a smooth inner surface and tapering edge surfaces joining said inner and outer surfaces, said expansion leaves each surrounding said bolt at a radially spaced distance from said bolt when said expansion assembly is positioned on said roof bolt, each of said leaf tapering edge surfaces being in abutting contact with said tapered plug tapered surfaces whereby said leaves are forced apart when said tapered plug is threaded axially onto said roof bolt and said leaves are restrained from axial movement relative to said roof bolt, each of said leaf serrated outer surfaces being formed with nine serration edges extending circumferentially around said leaf outer surface in parallel planes perpendicular to the axis of said bolt and being equally spaced a distance of no more than 0.27" and no less than 0.22" apart, said edges of said serrations being formed by intersecting surfaces with the surface closer to said bolt head being a planar surface perpendicular to said bolt axis and the surface closer to said bolt threaded portion being a frusto-conical surface;
   a metal bail connected to each of said expansion leaves and extending over the end of said roof bolt to prevent axial movement of said leaves relative to said bolt when said tapered plug is threaded onto said bolt threaded portion to force said leaves apart.

6. The expansion leaf of claim 5 wherein the total length of said leaf does not exceed 3".

7. An expansion assembly for a mine roof bolt having a threaded portion at one end and a bolt head at the other end comprising;
- a tapered plug having a body portion with a threaded internal bore adapted to be threaded onto said bolt threaded end portion, said tapered plug having two legs depending from said body portion that straddle said bolt and extend toward said bolt head when said plug is threaded onto said bolt threaded portions, said body portion and said depending legs forming continuous tapered surfaces;
- a pair of expansion leaves each having a serrated outer surface, a smooth inner surface and tapering edge surfaces joining said inner and outer surfaces, said expansion leaves each surrounding said bolt at a radially spaced distance from said bolt when said expansion assembly is positioned on said roof bolt, each of said leaf tapering edge surfaces being in abutting contact with said tapered plug tapered surfaces whereby said leaves are forced apart when said tapered plug is threaded axially onto said roof bolt and said leaves are restrained from axial movement relative to said roof bolt, each of said leaf serrated outer surfaces being formed with a plurality of serration edges extending circumferentially around said leaf outer surface in parallel planes perpendicular to the axis of said bolt and being substantially equally spaced, said edges of said serrations being formed by intersecting surfaces with the surface closer to said bolt head being a planar surface perpendicular to said bolt axis and the surface closer to said bolt threaded portion being a frusto-conical surface whose conical elements are at an angle of 69° to said planar surface;
- a metal bail connected to each of said expansion leaves and extending over the end of said roof bolt to prevent axial movement of said leaves relative to said bolt when said tapered plug is threaded onto said bolt threaded portion to force said leaves apart.

8. An expansion assembly for a mine roof bolt having a threaded portion at one end and a bolt head at the other end comprising;
- a tapered plug having a body portion with a threaded internal bore adapted to be threaded onto said bolt threaded end portion, said tapered plug having two legs depending from said body portion that straddle said bolt and extend toward said bolt head when said plug is threaded onto said bolt threaded portion, said body portion and said depending legs forming continuous tapered surfaces that each form an angle of at least 8° to the axis of said bolt when said plug is threaded onto said bolt;
- a pair of expansion leaves each having a serrated outer surface, a smooth inner surface and tapering edge surfaces joining said inner and outer surfaces, said expansion leaves each surrounding said bolt at a radially spaced distance from said bolt when said expansion assembly is positioned on said roof bolt, each of said leaf tapering edge surfaces being in abutting contact with said tapered plug tapered surfaces whereby said leaves are forced apart when said tapered plug is threaded axially onto said roof bolt and said leaves are restrained from axial movement relative to said roof bolt, each of said leaf serrated outer surfaces being formed with nine serration edges extending circumferentially around said leaf outer surface in parallel planes perpendicular to the axis of said bolt and being equally spaced a distance of no more than 0.27" and no less than 0.22" apart, said edges of said serrations being formed by intersecting surfaces with the surface closer to said bolt head being a planar surface perpendicular to said bolt axis and the surface closer to said bolt threaded portion being a frusto-conical surface;
- a metal bail connected to each of said expansion leaves and extending over the end of said roof bolt to prevent axial movement of said leaves relative to said bolt when said tapered plug is threaded onto said bolt threaded portion to force said leaves apart.

9. An expansion assembly for a mine roof bolt having a threaded portion at one end and a bolt head at the other end comprising;
- a tapered plug having a body portion with a threaded internal bore adapted to be threaded onto said bolt threaded end portion, said tapered plug having two legs depending from said body portion that straddle said bolt and extend toward said bolt head when said plug is threaded onto said bolt threaded portion, said body portion and said depending legs forming continuous tapered surfaces that each form an angle of at least 8° to the axis of said bolt when said plug is threaded onto said bolt;
- a pair of expansion leaves each having a serrated outer surface, a smooth inner surface and tapering edge surfaces joining said inner and outer surfaces, said expansion leaves each surrounding said bolt at a radially spaced distance from said bolt when said expansion assembly is positioned on said roof bolt, each of said leaf tapering edge surfaces being in abutting contact with said tapered plug tapered surfaces whereby said leaves are forced apart when said tapered plug is threaded axially onto said roof bolt and said leaves are restrained from axial movement relative to said roof bolt, each of said leaf serrated outer surfaces being formed with a plurality of serration edges extending circumferentially around said leaf outer surface in parallel planes perpendicular to the axis of said bolt and being substantially equally spaced, said edges of said serrations being formed by intersecting surfaces with the surface closer to said bolt head being a planar surface perpendicular to said bolt axis and the surface closer to said bolt threaded portion being a frusto-conical surface whose conical elements are at an angle of 69° to said planar surface;
- a metal bail connected to each of said expansion leaves and extending over the end of said roof bolt to prevent axial movement of said leaves relative to said bolt when said tapered plug is threaded onto said bolt threaded portion to force said leaves apart.

10. An expansion assembly for a mine roof bolt having a threaded portion at one end and a bolt head at the other end comprising;
- a tapered plug having a body portion with a threaded internal bore adapted to be threaded onto said bolt threaded end portion, said tapered plug having two legs depending from said body portion that straddle said bolt and extend toward said bolt head when said plug is threaded onto said bolt threaded portion, said body portion and said depending legs forming continuous tapered surfaces;

a pair of expansion leaves each having a serrated outer surface, a smooth inner surface and tapering edge surfaces joining said inner and outer surfaces, said expansion leaves each surrounding said bolt at a radially spaced distance from said bolt when said expansion assembly is positioned on said roof bolt, each of said leaf tapering edge surfaces being in abutting contact with said tapered plug tapered surfaces whereby said leaves are forced apart when said tapered plug is threaded axially onto said roof bolt and said leaves are restrained from axial movement relative to said roof bolt, each of said leaf serrated outer surfaces being formed with nine serration edges extending circumferentially around said leaf outer surface in parallel planes perpendicular to the axis of said bolt and being equally spaced a distance of no more than 0.27" and no less than 0.22" apart, said edges of said serrations being formed by intersecting surfaces with the surface closer to said bolt head being a planar surface perpendicular to said bolt axis and the surface closer to said bolt threaded portion being a frusto-conical surface whose conical elements are at an angle of 69° to said planar surface;

a metal bail connected to each of said expansion leaves and extending over the end of said roof bolt to prevent axial movement of said leaves relative to said bolt when said tapered plug is threaded onto said bolt threaded portion to force said leaves apart.

* * * * *